(12) United States Patent
Kudo (10) Patent No.: US 10,364,841 B2
(45) Date of Patent: Jul. 30, 2019

(54) LINEAR MOTION GUIDE DEVICE AND END CAP FOR LINEAR MOTION GUIDE DEVICE

(71) Applicant: NSK Ltd., Shinagawa-ku, Tokyo (JP)

(72) Inventor: Tetsuya Kudo, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/761,308

(22) PCT Filed: Sep. 16, 2016

(86) PCT No.: PCT/JP2016/077441
§ 371 (c)(1),
(2) Date: Mar. 19, 2018

(87) PCT Pub. No.: WO2017/047747
PCT Pub. Date: Mar. 23, 2017

(65) Prior Publication Data
US 2018/0266486 A1    Sep. 20, 2018

(30) Foreign Application Priority Data

Sep. 18, 2015 (JP) ................................ 2015-185796

(51) Int. Cl.
*F16C 29/06* (2006.01)
(52) U.S. Cl.
CPC .......... *F16C 29/0609* (2013.01); *F16C 29/06* (2013.01); *F16C 29/0642* (2013.01);
(Continued)
(58) Field of Classification Search
CPC ................................................. F16C 29/0609
See application file for complete search history.

(56) References Cited

U.S. PATENT DOCUMENTS 4,296,974 A * 10/1981 Teramachi ............... B23Q 1/40
384/45
4,743,124 A * 5/1988 Blaurock ............ F16C 29/0609
384/45
(Continued)

FOREIGN PATENT DOCUMENTS

CN    1172916 A    2/1998
CN    1506590 A    6/2004
(Continued)

OTHER PUBLICATIONS

International Preliminary Report on Patentability (PCT/IB/338 & PCT/IB/373) issued in PCT Application No. PCT/JP2016/077441 dated Mar. 29, 2018, including English translation of document C2 (Japanese-language Written Opinion (PCT/ISA/237)) previously filed on Mar. 19, 2018 (seven pages).
(Continued)

*Primary Examiner* — Thomas R Hannon
(74) *Attorney, Agent, or Firm* — Crowell & Moring LLP (57) ABSTRACT

A linear motion guiding device that is unlikely to cause a damage to a tongue unit of an end cap even when the linear motion guiding device is used under high-speed conditions is provided. An end cap (22) includes, at an end of a side of a raceway of an arc groove (222) that forms an outer peripheral surface of a direction changing passage (42), a tongue unit (25) that scoops up a ball (3) from a raceway (41) and guide the ball to a direction changing passage (42). A distal end surface (251) of the tongue unit includes a plane (251a) perpendicular to a direction along the raceway (41) and a circular-arc surface (251b) that caves into an arc shape from the plane. A curvature radius of a circular-arc surface is smaller than a radius of the ball. A center of a circle indicating a curvature of a circular-arc surface is present on a line shifted from a groove bottom line of the arc groove by
(Continued)

at least an offset amount between a raceway groove (12) of a side of the guide rail and the raceway groove (212) of a side of the slider.

3 Claims, 7 Drawing Sheets

(52) U.S. Cl.
    CPC ...... *F16C 29/0647* (2013.01); *F16C 29/0664* (2013.01); *F16C 2226/60* (2013.01)

(56) References Cited

U.S. PATENT DOCUMENTS

| | | | |
|---|---|---|---|
| 5,509,736 A | | 4/1996 | Keller et al. |
| 5,584,581 A | * | 12/1996 | Keller ............... F16C 29/0607 384/13 |
| 5,727,884 A | * | 3/1998 | Greiner ............. F16C 29/0607 384/13 |
| 6,042,269 A | | 3/2000 | Konomoto |
| 6,676,295 B2 | * | 1/2004 | Kasuga ............. F16C 29/0609 384/43 |
| 6,874,939 B2 | * | 4/2005 | Michioka ........... F16C 29/0609 384/45 |
| 7,229,212 B2 | | 6/2007 | Takeuchi |
| 9,816,559 B2 | * | 11/2017 | Chiu .................. F16C 33/6659 |
| 9,939,013 B2 | * | 4/2018 | Matsumoto ........ F16C 29/0609 |
| 2003/0185470 A1 | * | 10/2003 | Lee .................... F16C 29/0664 384/45 |
| 2004/0058007 A1 | | 3/2004 | Sundholm et al. |
| 2006/0269176 A1 | | 11/2006 | Ishihara et al. |
| 2008/0212905 A1 | | 9/2008 | Michioka et al. |
| 2009/0304312 A1 | | 12/2009 | Horie et al. |
| 2010/0111454 A1 | | 5/2010 | Natale et al. |
| 2010/0183252 A1 | | 7/2010 | Lin et al. |
| 2012/0128277 A1 | | 5/2012 | Ju et al. |
| 2014/0116166 A1 | | 5/2014 | Yamamoto et al. |
| 2016/0061261 A1 | | 3/2016 | Yamagishi |

FOREIGN PATENT DOCUMENTS

| | | |
|---|---|---|
| CN | 101641527 A | 2/2010 |
| CN | 102449333 A | 5/2012 |
| EP | 0 643 233 A1 | 3/1995 |
| EP | 2 811 187 A1 | 12/2014 |
| JP | 2004-68880 A | 3/2004 |
| JP | 2005-226795 A | 8/2005 |
| JP | 2006-316886 A | 11/2006 |
| JP | 2007-211969 A | 8/2007 |
| JP | 2008-275065 A | 11/2008 |
| JP | 4606416 B2 | 1/2011 |
| JP | 2012-107715 A | 6/2012 |
| JP | 2012-229814 A | 11/2012 |
| JP | 2013-61079 A | 4/2013 |
| JP | 2015-31378 A | 2/2015 |
| TW | 201407064 A | 2/2014 |
| TW | 201447129 A | 12/2014 |

OTHER PUBLICATIONS

Extended European Search Report issued in counterpart European Application No. 16846618.3 dated Aug. 3, 2018 (eight (8) pages).
International Search Report (PCT/ISA/210) issued in corresponding PCT Application No. PCT/JP2016/077441 dated Dec. 20, 2016 with English Translation, four (4) pages.
Japanese-language Written Opinion (PCT/ISA/237) issued in corresponding PCT/Application No. PCT/JP2016/077441 dated Dec. 20, 2016, four (4) pages.
Chinese-language Office Action issued in counterpart Chinese Application No. 201680053190 dated Jan. 2, 2019 with English translation (12 pages).

* cited by examiner

LINEAR MOTION GUIDE DEVICE AND END CAP FOR LINEAR MOTION GUIDE DEVICE

TECHNICAL FIELD

The present invention relates to a linear motion guiding device that includes a ball as a rolling element.

BACKGROUND ART

The linear motion guiding device that includes the ball as the rolling element includes a guide rail, a slider, and a plurality of balls. The slider is provided at an outside of the guide rail. The guide rail and the slider face with each other and respectively have, at facing positions, raceway grooves that form raceways of the balls. Both of the raceway grooves extend in a longer direction of the guide rail.

The slider includes a slider main body and a pair of end caps, the raceway groove and a return path of the ball are formed to the slider main body, and the direction changing passage of the ball is formed to the end cap. The ball is provided in the circulation pathway including the raceway, the return path, and the direction changing passage, and via the ball that rolls within the raceway in a load state, the slider linearly moves along the guide rail.

Formed on a surface of a side of the slider main body of the end cap, is a groove that forms the outer peripheral surface of the direction changing passage and includes an arc-shaped cross section (hereinafter, referred to as "arc groove"). Formed on an end of a side of the raceway of the arc groove is a tongue unit that scoops up the ball from the raceway and guides the ball to the direction changing passage.

When the linear motion guiding device is driven at a high speed, since the ball repeatedly clashes with the tongue unit of the end cap at high speed, a damage easily occurs to the tongue unit. Therefore, conventionally, a method for enhancing the stiffness of the tongue unit has been proposed.

For example, PTL 1 proposes to make a tip, to which the ball clashes, of the tongue unit to be a planar tip that is perpendicular to the direction in which the raceway (rolling element rolling passages) extends, a convex tip, or concave tip having a curvature radius of the radius or more of the ball. Accordingly, compared to a case when the tip is sharp, the contact area after the elastic deformation associated with the clash of the ball becomes large (when tip is concave, surface contact may occur), and thus, PTL 1 discloses that the contact pressure becomes small and the plastic deformation (damage) is unlikely to occur to the tip.

PTL 2 proposes that a portion of a front of at least the tongue unit of the arc groove is made to form Gothic arc shape, and by rendering the ball in a two-point contact state at the front of the tongue unit, the impact force applied to the ball is dispersed.

PTL 2 further discloses that when a line connecting the contact point of the ball relative to the tongue unit (scooping unit) with the center of the ball contacted with the tongue unit is L10, and a line connecting the center of the ball contacted with the tongue unit and the groove bottom of the Gothic arc shaped arc groove is L20, an angle between L10 and L20 is preferably 40 degrees or more and 60 degrees or less.

PTL 3 discloses that only the tongue unit (rolling element scoop-up unit that scoops up rolling element from load rolling path to direction changing passage) is separated from the end cap, the end cap includes a main body and the tongue unit attached thereto, and the tongue unit is formed by a material having higher shock resistance than that of the main body. The tongue unit is, via a fastening member such as thread, fixed to the main body.

CITATION LIST

Patent Literature

PTL 1: JP 2004-68880
PTL 2: JP 4606416
PTL 3: JP 2008-275065

SUMMARY OF INVENTION

Technical Problem

With respect to the end cap disclosed in PTL 1, when the ball is scooped up with the tongue unit, the ball contacts at one point to the tongue unit, and thus, in terms of the shock resistance of the tongue unit when the tongue unit is used under high-speed conditions, there is room for improvement.

With respect to the end cap disclosed in PTL 2, at least a portion of the arc groove is formed into the Gothic arc shape, and thus, in terms of the manufacturing cost, there is room for improvement.

With respect to the end cap disclosed in PTL 3, when a fixed part is used under the high-speed conditions, a stiffness of the fixed part is insufficient, and thus, in terms of the durability, there is room for improvement.

An object of the present invention is to provide a linear motion guiding device that is unlikely to cause a damage to a tongue unit of an end cap even when the linear motion guiding device is used under high-speed conditions.

Solution to Problem

To achieve the above object, a first aspect of the present invention provides the linear motion guiding device having following configurations of (1) to (4).
(1) The linear motion guiding device includes the guide rail, the slider, and a plurality of balls, and the slider is provided to an outside of the guide rail. The guide rail and the slider face with each other, and at facing positions, respectively have raceway grooves that form raceways of the balls. Both of the raceway grooves extend in a longer direction of the guide rail.
(2) The slider includes a slider main body and a pair of end caps, the raceway groove and the return path of the ball are formed on the slider main body, and the direction changing passage of the ball is formed on the end cap. The ball is provided in a circulation pathway including the raceway, the return path, and the direction changing passage, and via the ball rolling within the raceway in the load state, the slider linearly moves along the guide rail.
(3) On a surface of a side of the slider main body of the end cap, an arc groove that forms an outer peripheral surface of the direction changing passage is formed. To an end of a side of the raceway of the arc groove, a tongue unit that scoops up the ball from the raceway and guides the ball to the direction changing passage is formed.
(4) Distal end surfaces of the tongue unit include a plane that is perpendicular to the direction along the raceway and a circular-arc surface that recesses in an arc shape from the plane. A curvature radius of the circular-arc surface is smaller than a radius of the ball. A center of a circle indicating a curvature of the circular-arc surface is present on a line that is shifted from a groove bottom line of the arc groove by at least an offset amount between the raceway groove of the guide rail side and the raceway groove of the slider side.

To achieve the above object, a second aspect of the present invention provides the end cap of the linear motion guiding device having following configurations of (11) to (14).

(11) The linear motion guiding device includes the guide rail, the slider, and the ball, via the ball rolling in the load state within the raceway formed with the raceway groove that is provided to facing positions of the guide rail and the slider, the slider linearly moves along the guide rail in the linear motion guiding device, and the end cap configures the slider of the linear motion guiding device.

(12) The end cap includes a first component, a second component, and a third component. The first component includes a first leg unit that is provided at one side of the guide rail in a width direction, the arc groove that forms the outer peripheral surface of the direction changing passage of the ball is formed, and to the end of the raceway side on the arc groove, the tongue unit that scoops up the ball from the raceway and guides the ball to the direction changing passage is formed. The second component includes a second leg unit that is provided to the other side of the guide rail in the width direction, the arc groove that forms the outer peripheral surface of the direction changing passage of the ball is formed, and to the end of the raceway side of the arc groove, the tongue unit that scoops up the ball from the raceway and guides the ball to the direction changing passage is formed. The third component includes a part provided above the guide rail and includes an engagement surface with the first component and the second component.

(13) The first component and the second component are made of metal materials.

(14) The first component and the second component, and the third component are connected via a fastener component.

Advantageous Effects of Invention

According to the present invention, it is possible to provide a linear motion guiding device that is unlikely to cause a damage to a tongue unit of an end cap even when the linear motion guiding device is used under high-speed conditions.

DESCRIPTION OF EMBODIMENTS

First Aspect and Second Aspect

Effect of First Aspect

The tongue unit satisfies the above configuration (4), and thus, two boundaries between the plane and the circular-arc surface are present, and the ball contacts the two boundaries when the ball is scooped up with the tongue unit. Accordingly, the impact force of the ball is dispersed into two places, and thus, the occurrence of the crack to the tongue unit is suppressed even when the tongue unit is used under the high-speed conditions.

Note that descriptions of the effect do not limit components of the present invention and the linear motion guiding device of the first aspect.

When the linear motion guiding device of the one aspect has the below configuration (5), compared to a case where the linear motion guiding device does not have the below configuration (5), the tongue unit can smoothly scoop up the ball.

(5) When the groove bottom line of the arc groove is Lm, and straight lines connecting the contact point of the ball relative to the distal end surface with a center Oe of an opening circle E of the raceway side of the direction changing passage present on the groove bottom line Lm are L1 and L2, an angle between the groove bottom line Lm and the straight lines L1 and L2 is 20 degrees or more and 40 degrees or less.

Note that the configuration (5) does not limit components of the linear motion guiding device of the first aspect.

Effects of Second Aspect

According to the end cap of the second aspect, the first component and the second component formed with the tongue unit are made of metal materials, and thus, compared to the end cap having the tongue unit made of synthetic resins, the damage is unlikely to occur to the tongue unit. Further, compared to a case where only the tongue unit is separated from the end cap, the tongue unit is made of materials having higher shock resistance than that of the main body, and the tongue unit is connected with the main body, an intensity of a tongue unit is increased.

Note that descriptions of the effect do not limit components of the present invention and the linear motion guiding device of the second aspect.

Embodiment

Hereinafter, embodiments of the present invention are described, but the present invention is not limited to the following embodiments. Further, in the following embodiments, although technically preferred limitations are made to carry out the invention, the limitation is not an essential requirement of the present invention.

First Embodiment

Figure 1:
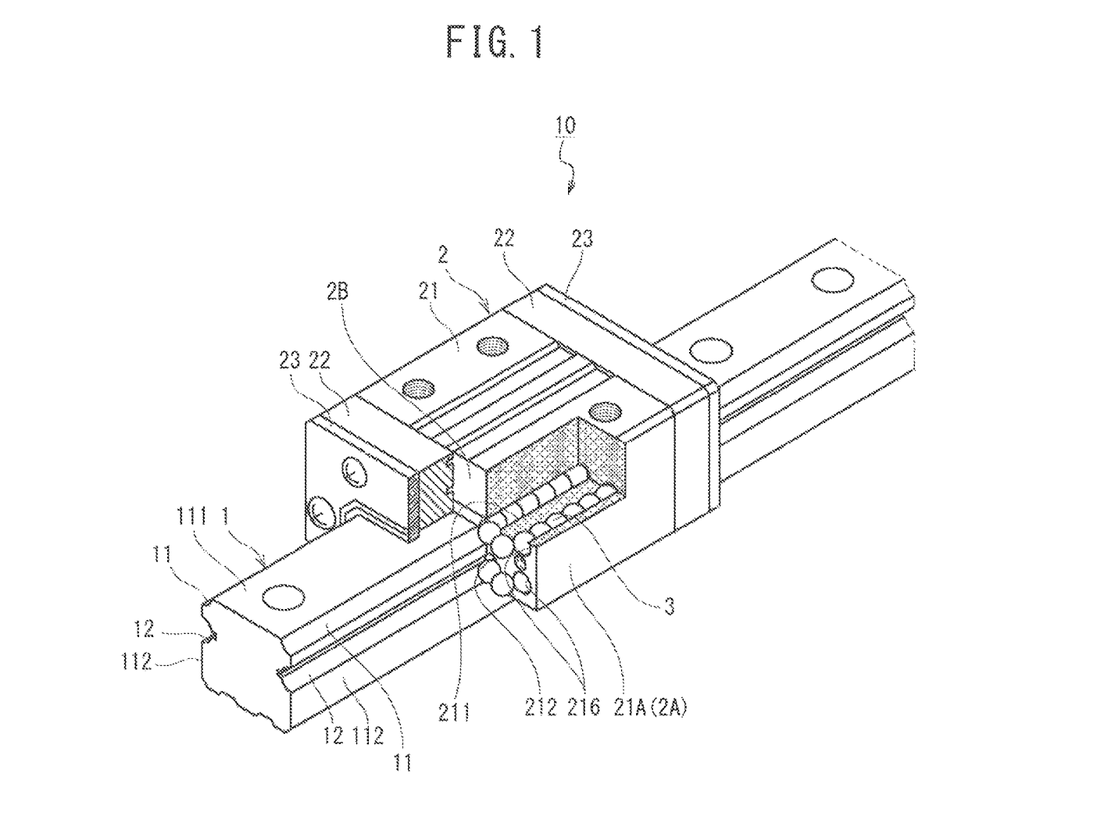
FIG. 1 is a partially cutaway perspective view illustrating a linear motion guiding device according to a first embodiment.

As illustrated in FIG. 1, a linear motion guiding device 10 according to the first embodiment includes a guide rail 1, a slider 2, and a plurality of balls 3.

The slider 2 has a shape in which leg units 2A provided at both sides of the width direction of the guide rail 1 and a body unit 2B for connecting both of the leg units 2A are integrated.

The guide rail 1 is metallic, includes an upper surface 111 that faces an inner surface of the body unit 2B of the slider 2, and includes a side surface 112 that faces an inner surface of the leg units 2A. At an upper corner including the upper surf-ace 111 and the side surface 112 of the guide rail 1, a raceway groove 11 is formed, and to the side surface 112 of the guide rail 1, a raceway groove 12 with a relief groove 13 is formed.

The slider 2 is, in a linear motion direction of the guide rail 1, divided into the slider main body 21, a pair of end caps 22, and a pair of side seals 23.

The slider main body 21 is metallic and at an inside of the leg unit 21A, at positions facing with respective raceway grooves 11 and 12 of the guide rail 1, the raceway grooves 211 and 212 are respectively formed. To each leg unit 21A of the slider main body 21, a return path 216 corresponding to the respective raceway grooves 211 and 212 is formed.

Figure 2:
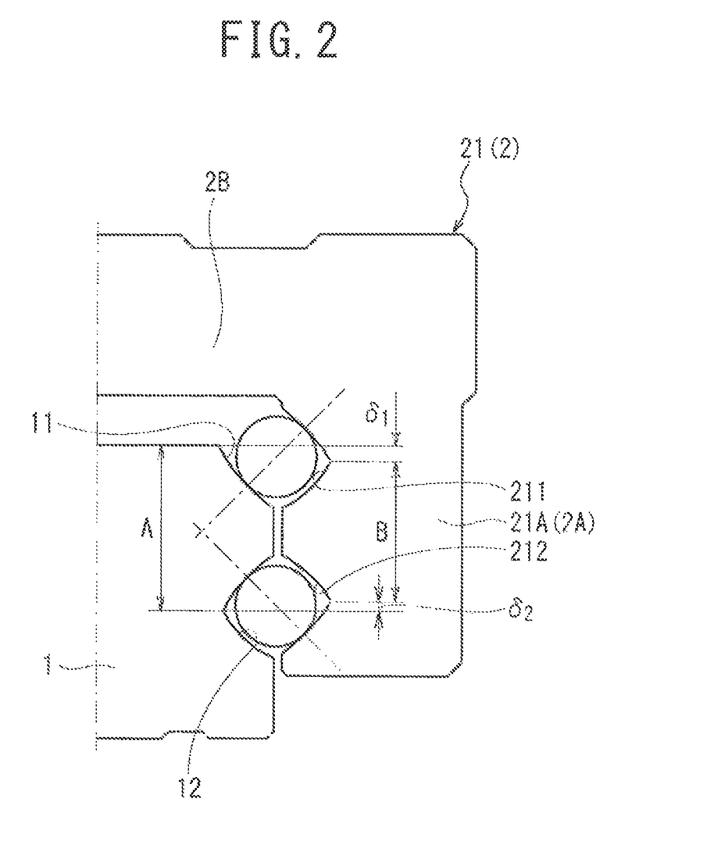
FIG. 2 is a partial front view explaining a raceway of the linear motion guiding device according to the first embodiment.

As illustrated in FIG. 2, the raceway groove 12 of the guide rail 1 and the raceway grooves 211 and 212 of the slider 2 are Gothic arc grooves in which two arcs having different centers are combined. Further, in the linear motion guiding device according to the first embodiment, an offset design is conducted such that an interval between the upper raceway groove and the lower raceway groove in the guide rail 1 is different from an interval between the upper raceway groove and the lower raceway groove in the slider main body 21 (A>B). The offset amount of the upper raceway is δ1 and the offset amount of the lower raceway is δ2.

Figure 3:
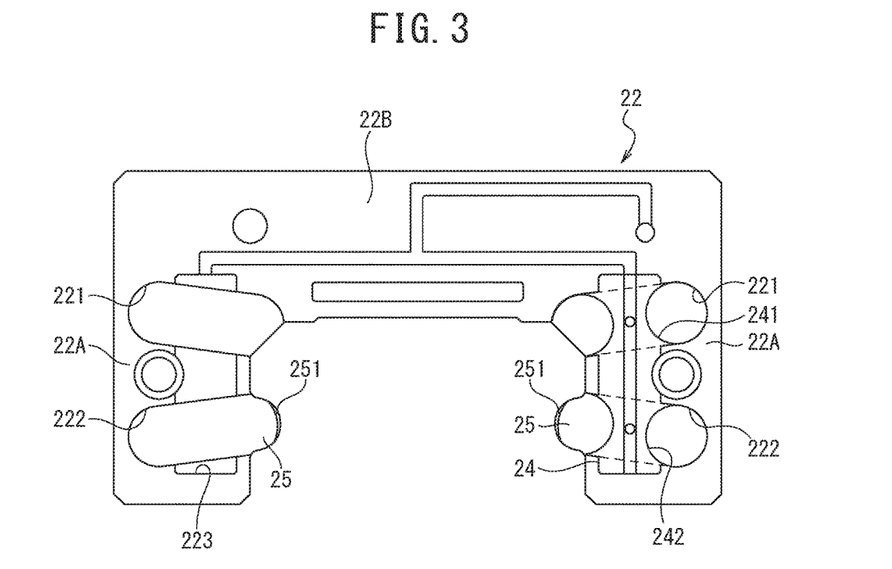
FIG. 3 is a front view illustrating a slider main body side of an end cap configuring the linear motion guiding device according to the first embodiment.

As illustrated in FIG. 3, an end cap 22 includes a pair of leg units 22A and a body unit 22B, and on a surface of the slider main body side of each leg unit 22A, arc grooves 221 and 222 that form the outer peripheral surface of the direction changing passage and a concave unit 223 to which the return guide 24 is fitted are formed. A leg unit 22A at a left side of FIG. 3 illustrates the concave unit 223 before the return guide 24 is fitted, and the leg unit 22A of a right side of FIG. 3 illustrates the concave unit 223 after the return guide 24 is fitted.

To the return guide 24, internal arc surfaces 241 and 242 that form an inner circumferential surface of the direction changing passage are formed. By the return guide 24 being fitted into the concave unit 223 of the end cap 22, with the arc grooves 221 and 222 of the end cap 22 and the internal arc surfaces 241 and 242 of the return guide 24, the direction changing passage is formed.

In the linear motion guiding device 10, by the mutually facing raceway grooves 11 and 12 of the guide rail 1 and the mutually facing raceway grooves 211 and 212 of the slider 2, the two pairs of four rows raceway is formed, and each raceway is connected with each return path 216 via the direction changing passage. In other words, the circulation pathway of the balls 3 including the raceway, the return path 216, and the direction changing passage is provided in two pairs of four rows, and within each circulation pathway, the plurality of balls 3 are provided. Accordingly, in the linear motion guiding device 10, via the balls 3 rolling within the two pairs of four rows raceway in the load state, the slider 2 linearly moves along the guide rail 1.

With respect to the end cap 22, to the end of the raceway side of an arc groove 222 of the lower raceway, a tongue unit 25 that scoops up the ball 3 from the raceway and guides the ball to each direction changing passage is formed.

Details of the shape of the tongue unit 25 are described with reference to FIGS. 4 to 8.

Figure 4:
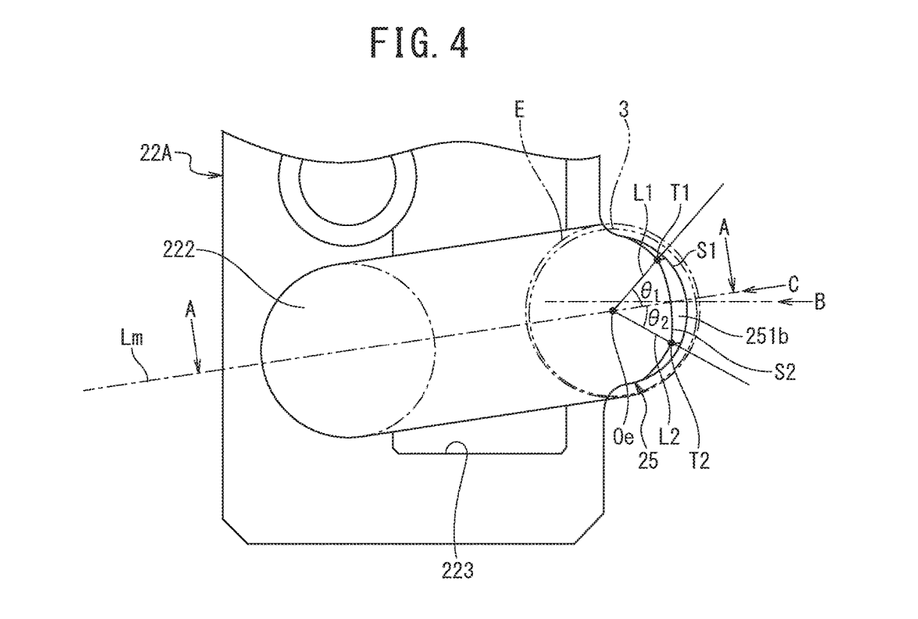
FIG. 4 is a partial enlarged view of FIG. 3.
Figure 5:
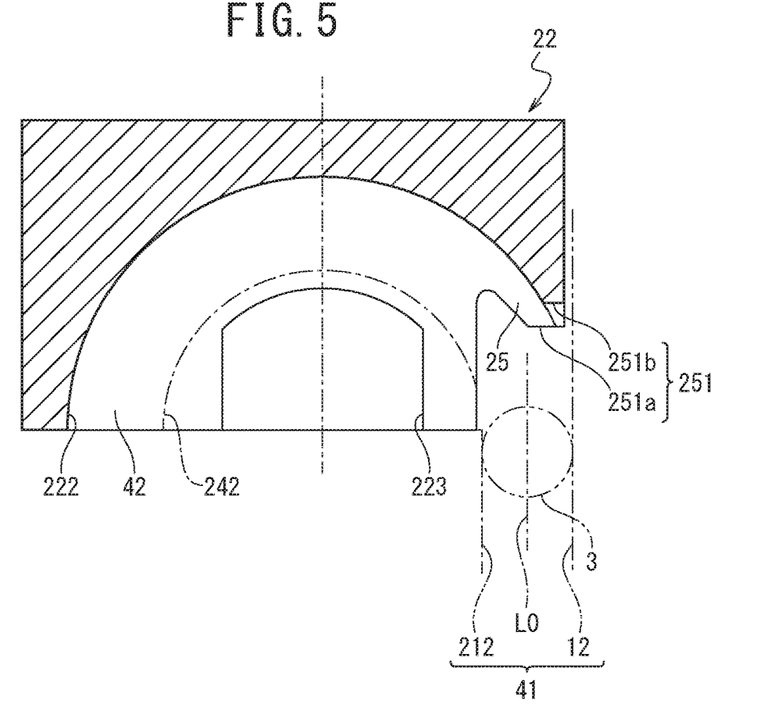
FIG. 5 cross-sectional view taken along a line A-A of FIG. 4.

FIG. 4 is a partial enlarged view obtained by enlarging the arc groove 222 and the tongue unit 25 of the end cap 22. FIG. 5 illustrates the cross-sectional view taken along a line A-A of FIG. 4 and FIG. 6 illustrates an arrow view as viewed from an arrow B of FIG. 4.

Figure 6:
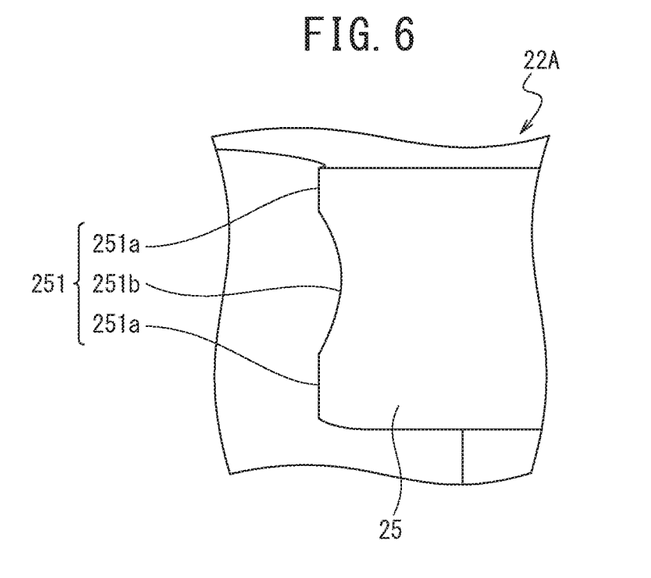
FIG. 6 is a view as viewed from the arrow B in FIG. 4.

As illustrated in FIGS. 5 and 6, a distal end surface 251 of the tongue unit 25 includes a pair of planes 251a that is perpendicular to a direction L0 in which the raceway 41 configured of the raceway grooves 12 and 212 extends and a circular-arc surface 251b that caves into an arc-shape from a surface including both planes 251a. As illustrated in FIG. 5, the ball 3 is scooped up by the tongue unit 25 from the raceway 41 and is guided to a direction changing passage 42 including the arc groove 222 of the end cap 22 and the internal arc surface 242 of the return guide 24.

Figure 7:
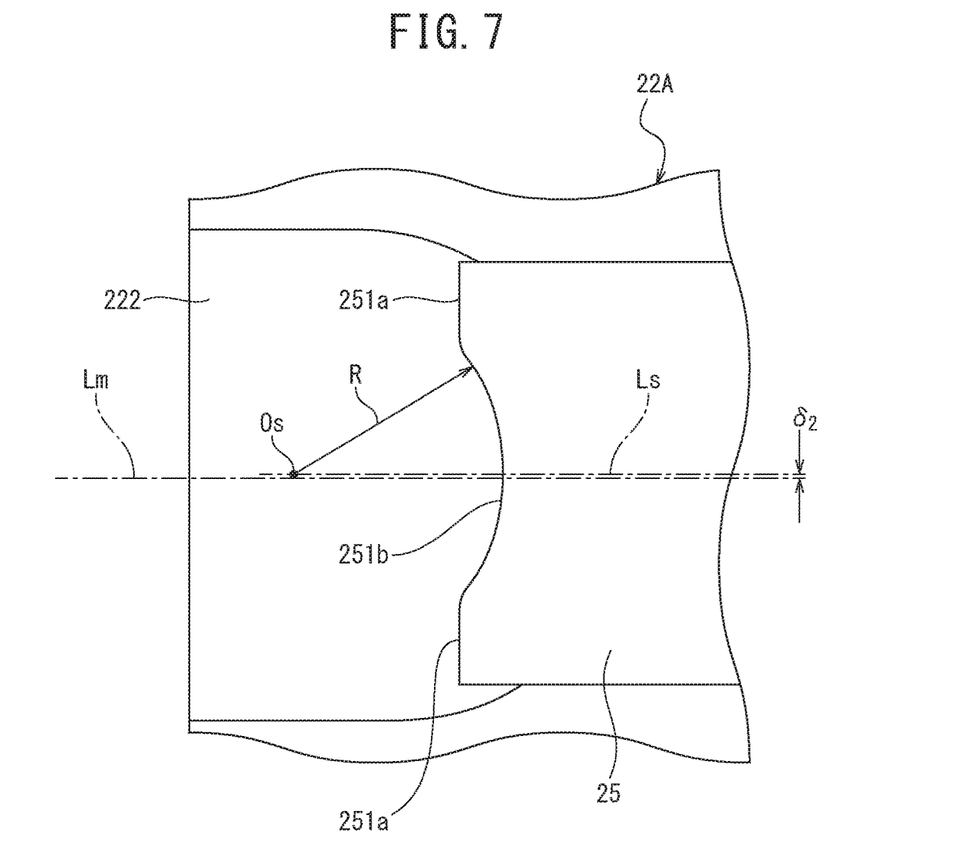
FIG. 7 is a drawing for explaining a relationship between the distal end surface of the tongue unit and the arc groove in the end cap of FIG. 3.

FIG. 7 is an arrow view as viewed from an arrow C of FIG. 4 and illustrates a pair of planes 251a and the circular-arc surface 251b with respect to either one of lines S1 or S2 indicating both ends in the width direction of the distal end surface 251. As illustrated in FIG. 7, a center Os of a circle indicating the curvature of the circular-arc surface 251b is present on a straight line Ls that is shifted to upside from the groove bottom line Lm of the arc groove 222 by at least an offset amount δ2. Further, a curvature radius R of the circular-arc surface 251b is smaller than the radius of the ball 3.

Figure 8:
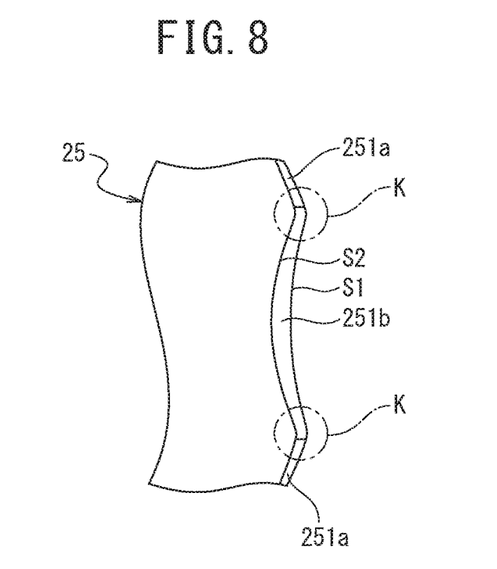
FIG. 8 is an enlarged perspective view of the distal end surface of the tongue unit.

FIG. 8 is a perspective view obtained by viewing the tongue unit 25 from the distal end surface 251 side. By the tongue unit 25 having the above described shape, when the ball 3 is scooped up by the tongue unit 25, the ball contacts with two boundaries K between a plane 251a and the circular-arc surface 251b.

Further, as illustrated in FIG. 4, when the straight lines connecting contact points T1 and T2 of the ball 3 relative to the distal end surface 251 of the tongue unit 25 with the center Oe of the opening circle E of the raceway side of the direction changing passage that is present on the groove bottom line Lm of the arc groove 222 are L1 and L2, angles θ1 and θ2 between the groove bottom line Lm and the straight lines L1 and L2 are from 20 degrees or more to 40 degrees or less. The angles 81 and 92 can be altered by changing the curvature radius R (FIG. 7) of the circular-arc surface 251b.

As described above, with respect to the end cap 22, when the ball 3 is scooped up by the tongue unit 25, the ball contacts with the tip of the tongue unit 25 at two points, and thus, the impact force of the ball 3 is dispersed into two directions. Accordingly, even when the linear motion guiding device 10 is used under high-speed conditions, the occurrence of the crack to the tongue unit 25 is suppressed.

Further, since angles θ1 and θ2 relative to the groove bottom line Lm of the contact points T1 and T2 of the ball 3 that contacts with the tip of the tongue unit 25 at two points are in the range from 20 degrees or more to 40 degrees or less, compared to a case where the angles are not within this range, the tongue unit 25 can smoothly scoop up the ball 3.

Second Embodiment

Figure 9:
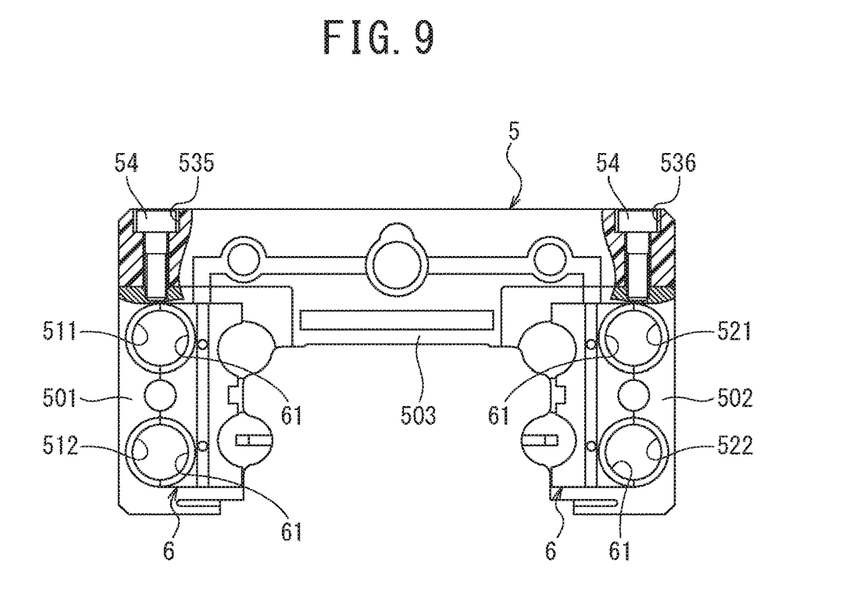
FIG. 9 is a front view illustrating a slider main body side of an end cap configuring a linear motion guiding device according to a second embodiment.

A linear motion guiding device according to the second embodiment includes an end cap 5 illustrated in FIG. 9 instead of the end cap 22 configuring the slider 2 in the linear motion guiding device of FIG. 1.

Figure 10:
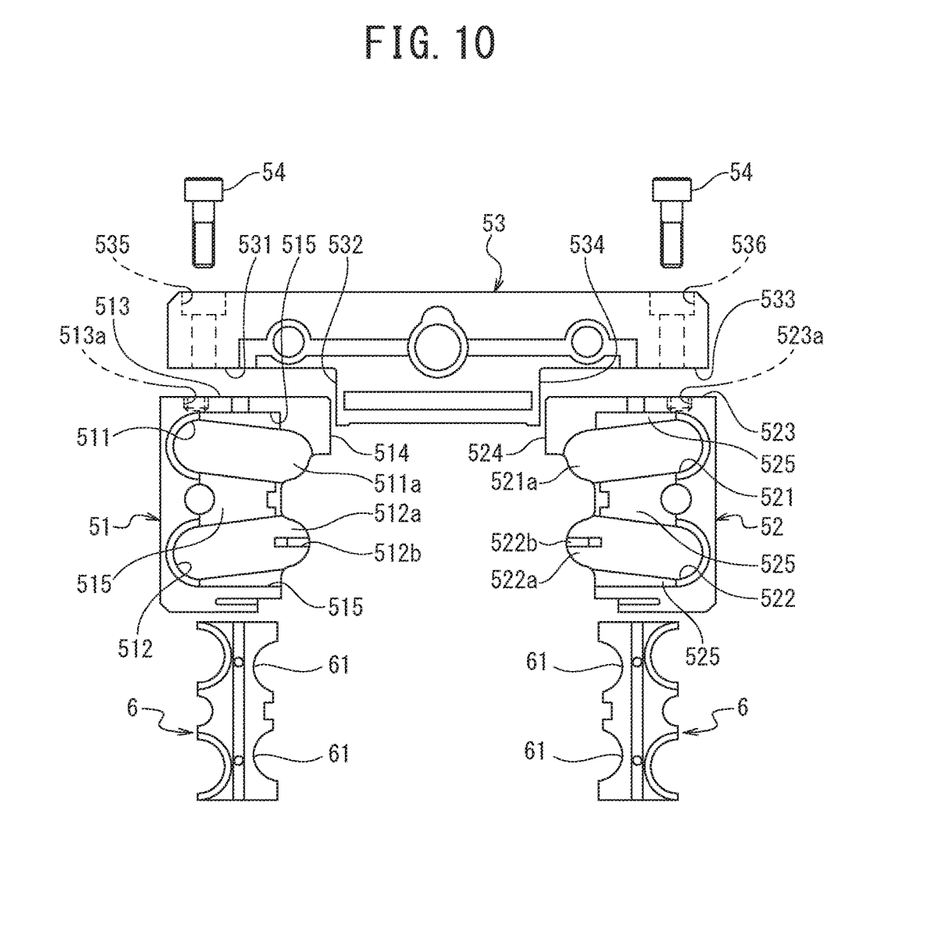
FIG. 10 is a front view illustrating each component configuring the end cap of FIG. 9.

As illustrated in FIG. 10, the end cap 5 includes a first component 51, a second component 52, a third component 53, and two bolts (fastener component) 54.

The first component 51 includes a first leg unit 501 provided at one side in the width direction of the guide rail, and to the surface of the slider main body side, arc grooves 511 and 512 that form the outer peripheral surface of the direction changing passage of the ball are formed. The arc grooves 511 and 512 have, at the end of the raceway side, the tongue units 511a and 512a. To a tongue unit 512a of an arc groove 512, a concave unit 512b to which the end of a holding wire for holding the ball is fitted is formed.

At an upper side of an arc groove 511, in the space between both of the arc grooves 511 and 512, and at a lower side of the arc groove 512, a concave unit 515 to which the return guide 6 is fitted is formed.

The second component 52 includes a second leg unit 502 that is provided to the other side in the width direction of the guide rail, and to the surface of the slider main body side, arc grooves 521 and 522 that form the outer peripheral surface of the direction changing passage of the ball are formed. The arc grooves 521 and 522 have, at the end of the raceway side, the tongue units 521a and 522a. To a tongue unit 522a of an arc groove 522, a concave unit 522b to which the end of the holding wire for holding the ball is fitted is formed.

To an upper side of an arc groove 521, in the space between both of the arc grooves 521 and 522, and at a lower side of the arc groove 522, a concave unit 525 to which the return guide 6 is fitted is formed.

The third component 53 includes a part 503 provided above the guide rail, engagement surfaces 531 and 532 with the first component 51, and engagement surfaces 533 and 534 with the second component 52.

The first component 51 includes engagement surfaces 513 and 514 that contact with respective engagement surfaces 531 and 532 of the third component 53. To an engagement surface 513 of the first component 51, a female thread 513a to which a tip of a bolt 54 is screwed is formed. The second component 52 includes engagement surfaces 523 and 524 that contact with the respective engagement surfaces 533 and 534 of the third component 53. To an engagement surface 523 of the second component 52, a female thread 523a to which a tip of the bolt 54 is screwed is formed.

The third component 53 includes bolt insertion holes 535 and 536 through which a bolt vertically passes through. The bolt insertion hole 535 communicates with the female thread 513a of the first component 51 under a state where the engagement surface 531 contacts with the engagement surface 513 of the first component 51 and the engagement surface 532 contacts with the engagement surface 514 of the first component 51. A bolt insertion hole 536 communicates with the female thread 523a under a state where the engagement surface 533 contacts with the engagement surface 523 of the second component 52 and the engagement surface 534 contacts with an engagement surface 524 of the second component 52. The first component 51 and the second component 52 are made of an alloy tool steel, and the third component 53 is made of polyoxymethylene (POM).

The end cap 5 is assembled by the following method.

The engagement surface 531 of the third component 53 is caused to contact with the engagement surface 513 of the first component 51, the engagement surface 532 of the third component 53 is caused to contact with the engagement surface 514 of the first component 51, the bolt insertion hole 535 is caused to communicate with the female thread 513a, the bolt 54 is inserted into the bolt insertion hole 535, and a male thread of the bolt 54 is screwed with the female thread 513a.

Further, the engagement surface 533 of the third component 53 is caused to contact with the engagement surface 523 of the second component 52, the engagement surface 534 of the third component 53 is caused to contact with the engagement surface 524 of the second component 52, the bolt insertion hole 536 is caused to communicate with the female thread 523a, the bolt 54 is inserted into the bolt insertion hole 536, and a male thread of the bolt 54 is screwed with the female thread 523a.

Accordingly, the first component 51 and the second component 52, and the third component 53 are connected via the bolts 54 to form the end cap 5.

By fitting the return guide 6 to the respective concave units 515 and 525 of the end cap 5, with the are groove 521 of the end cap 5 and the internal are surface 61 of the return guide 6, the direction changing passage of the ball is formed.

According to the end cap 5 of the second embodiment, the arc grooves 511 and 512 having the tongue units 511a and 512a are formed to the first component 51 and the arc grooves 521 and 522 having the tongue units 521a and 522a are formed to the second component 52, and since the first component 51 and the second component 52 are metallic, compared to a component the entirety of which is integrally made of synthetic resins, the tongue units 511a, 512a, 521a, and 522a have an excellent durability against the impact force of the ball 3.

Accordingly, even when the tongue unit is used under high-speed conditions, the occurrence of the crack to the tongue units 511a, 512a, 521a, and 522a is suppressed.

Further, compared to a metallic end cap entirety of which is integrally formed, the material cost and the manufacturing cost can be reduced.

When specifications such as diameter of the arc groove and a length of the tongue unit, of the end cap are different, the third component 53 is should be a common component and the first component 51 and the second component 52 having different specifications should be prepared, and accordingly it is possible to handle an end cap of a plurality of specifications.

All of the first component 51, the second component 52, and the third component 53 can be metallic and connected via the bolt 54 to produce an end cap.

REFERENCE SIGNS LIST 1 guide rail
11 raceway groove of guide rail
12 raceway groove of guide rail
111 upper surface of guide rail
13 relief groove
2 slider
2A leg unit of slider
2B body unit of slider
21 slider main body
211 raceway groove of slider
212 raceway groove of slider
216 return path
22 end cap
22A leg unit of end cap
22B body unit of end cap
221 arc groove that forms outer peripheral surface of direction changing passage
222 arc groove that forms outer peripheral surface of direction changing passage 23 side seal
24 return guide
241, 242 internal arc surface that forms inner circumferential surface of direction changing passage
25 tongue unit
251 distal end surface of tongue unit
251a plane of distal end surface
251b circular-arc surface of distal end surface
3 ball
41 raceway
42 direction changing passage
5 end cap
501 first leg unit
502 second leg unit
503 part provided above guide rail
51 first component
511, 512 arc groove
511a, 512a tongue unit
512b concave unit to which end of holding wire is fitted
513 engagement surface with third component
513a female thread
514 engagement surface with third component
515 concave unit to which return guide is fitted
52 second component
521, 522 arc groove
521a, 522a tongue unit
522b concave unit to which end of holding wire is fitted
523 engagement surface with third component
523a female thread
524 engagement surface with third component
525 concave unit to which return guide is fitted
53 third component
531, 532 engagement surface with first component
533, 534 engagement surface with second component
535, 536 bolt insertion hole
54 bolt (fastener component)
6 return guide
61 internal arc surface that forms inner circumferential surface of direction changing passage
E opening circle of raceway side of direction changing passage
K boundary between plane of distal end surface and circular-arc surface
L0 direction in which raceway extends
Lm groove bottom line of arc groove
Ls straight line on which center of circle indicating curvature of circular-arc surface 251b is present
Oe center of opening circle E present on groove bottom line of arc groove
Os center of circle indicating curvature of circular-arc surface 251b
R curvature radius of circular-arc surface 251b
T1 contact point of ball
T2 contact point of ball

The invention claimed is:

1. A linear motion guiding device comprising:
  a guide rail;
  a slider; and
  a plurality of balls, wherein
    the slider is provided at an outside of the guide rail;
    the guide rail and the slider face with each other and respectively include, at mutually facing positions, a raceway groove to form a raceway of the balls, and both of the raceway grooves extend in a longer direction of the guide rail;
    the slider includes a slider main body and a pair of end caps;
    the raceway groove and a return path of the balls are formed to the slider main body, and a direction changing passage of the balls is formed to the end cap;
    the balls are provided in a circulation pathway including the raceway, the return path, and the direction changing passage;
    an arc groove configured to form an outer peripheral surface of the direction changing passage is formed in a side facing the slider main body of the end cap;
    a tongue unit configured to scoop up the balls from the raceway and guide the balls to the direction changing passage is formed to an end of a side of the raceway of the arc groove;
    a distal end surface of the tongue unit includes a plane perpendicular to a direction along the raceway and a circular-arc surface configured to cave into an arc shape from the plane;
    a curvature radius of the circular-arc surface is smaller than a radius of the balls;
    a center of a circle indicating a curvature of the circular-arc surface is present on a line shifted from a groove bottom line of the arc groove by at least an offset amount between the raceway groove of a side of the guide rail and the raceway groove of a side of the slider; and
    via the balls rolling within the raceway m a load state, the slider linearly moves along the guide rail.

2. The linear motion guiding device according to claim 1, wherein when a groove bottom line of the arc groove is Lm and straight lines connecting a contact point of the balls relative to the distal end surface with a center of an opening circle of a side of the raceway of the direction changing passage present on a groove bottom line Lm are L1 and L2, an angle between the groove bottom line Lm and the straight lines L1 and L2 is from 20 degrees or more to 40 degrees or less.

3. An end cap for a linear motion guiding device configuring a slider of the linear motion guiding device in which a guide rail, the slider, and a ball are provided, and via the ball rolling in a load state within a raceway formed with a raceway groove formed to a mutually facing position of the guide rail and the slider, the slider linearly moves along the guide rail, the end cap comprising:
  a first component in which a first leg unit provided at one side in a width direction of the guide rail is provided, an arc groove that forms an outer peripheral surface of a direction changing passage of a ball is formed, and, to an end of a side of the raceway of the arc groove, a tongue unit configured to scoop up the ball from the raceway and guide the ball to the direction changing passage is formed;
  a second component in which a second leg unit provided to the other side in the width direction of the guide rail is provided, an arc groove that forms an outer peripheral surface of a direction changing passage of the ball is formed, and, to an end of a side of the raceway of the arc groove, a tongue unit configured to scoop up the ball from the raceway and guide the ball to the direction changing passage is formed; and
  a third component including a part provided above the guide rail and an engagement surface with the first component and the second component; wherein,
    the first component and the second component are made of a metal material;

the first component and the second component, and the third component are connected via a fastener component; and the third component is made of a synthetic resin material.

* * * * *